United States Patent [19]

Thomas

[11] Patent Number: 4,651,907
[45] Date of Patent: Mar. 24, 1987

[54] METHOD AND APPARATUS FOR DISPENSING A FLUID USING A FLUID-OPERATED TIMER

[75] Inventor: John E. Thomas, River Falls, Wis.

[73] Assignee: Economics Laboratory, Inc., St. Paul, Minn.

[21] Appl. No.: 800,523

[22] Filed: Nov. 21, 1985

[51] Int. Cl.⁴ .............................................. B67D 5/08
[52] U.S. Cl. ................................. 222/639; 222/504; 251/16; 251/52; 137/624.11
[58] Field of Search ..................... 251/16, 51, 52, 53; 222/14, 16, 638, 639, 334, 504; 137/624.11; 91/35

[56] References Cited

U.S. PATENT DOCUMENTS

| | | | |
|---|---|---|---|
| 549,479 | 11/1895 | Hall | 137/559 |
| 1,736,803 | 11/1929 | Shields et al. | 137/564.5 |
| 2,316,307 | 4/1943 | Young | 299/73 |
| 2,549,909 | 4/1951 | Joynes | 251/138 |
| 2,796,090 | 6/1957 | Carriol | 251/16 X |
| 2,973,781 | 3/1961 | Cadella | 137/553 |
| 3,085,715 | 4/1963 | Douglas | 222/70 |
| 3,397,646 | 8/1968 | Allsopp, Jr. | 103/149 |
| 3,410,518 | 11/1968 | Carsten | 251/62 X |
| 3,606,241 | 9/1971 | Bornholdt | 251/52 |
| 3,823,846 | 7/1974 | Probst | 222/70 |
| 3,914,434 | 7/1965 | Evanson | 222/1 |
| 4,057,173 | 11/1977 | Tal | 222/20 |
| 4,252,252 | 2/1981 | Gross et al. | 222/14 |
| 4,449,543 | 5/1984 | Green, Jr. | 137/3 |
| 4,570,899 | 2/1986 | Kingham | 251/51 |

Primary Examiner—Joseph J. Rolla
Assistant Examiner—Michael S. Huppert
Attorney, Agent, or Firm—Merchant, Gould, Smith, Edell, Welter and Schmidt

[57] ABSTRACT

A preferred cleaning system (10) is disclosed which includes a hydraulic timer valve (22) which is in fluid communication with a cleaning chemical dispenser (14) and a water supply (12). The hydraulic timer valve (22) preferably includes a bearing arrangement (44) which is spring biased toward a first end (56) of a timer housing (52). When a water supply valve (20) is opened, water flows into housing (52) to cause the bearing arrangement (44) to move from its first position to a second position. When the bearing arrangement (44) reaches its second position, water flow from the water supply (12) to the chemical dispenser (14) is prevented. The movement of the bearing arrangement (44) from its first position to its second position takes a preselected period of time determined by the flow resistance produced by a control valve (35) which controls the flow of water to one side of the bearing arrangement (44) of valve (22). When the water supply (12) is blocked, the valve (22) automatically resets. The bearing arrangement (44) is moved from its second position to its first position and the water which formerly coerced the bearing arrangement (44) so as to block the flow of water to the dispenser (14) is forced out of the housing (52) through lines (24 and 38) and vented to the atmosphere.

22 Claims, 2 Drawing Figures

METHOD AND APPARATUS FOR DISPENSING A FLUID USING A FLUID-OPERATED TIMER

FIELD OF THE INVENTION

The Invention relates generally to fluid-operated timers, and more particularly to automatic hydraulic timers utilized to dispense a predetermined amount of cleaning solution by regulating the flow of a solvent to a concentrated cleaning chemical.

BACKGROUND OF THE INVENTION

Fluid-operated timers are well-known devices. Generally, a fluid-operated timer is a device which utilizes a "control fluid" to determine or measure a period of time. A fluid-operated timer can be mechanically coupled to a valve such that when a preselected period of time elapses the timer causes the valve to either open or close, thereby regulating the flow of a fluid. As recognized by those skilled in the art, a portion of the regulated fluid can be used as the control fluid for the timer. The present invention is generally directed to such a fluid-operated timer.

The control fluid or regulated fluid associated with a fluid-operated timer could be a liquid or a gas. The present invention, however, is particularly directed to a liquid-operated timer which is mechanically coupled to a valve suitable for controlling the flow of a liquid, wherein a portion of the regulated liquid is used as the control liquid.

A preferred embodiment of the invention is a hydraulic timer apparatus which is coupled to a hydraulic valve suitable for controlling the flow of water from a source to a utilization point. The preferred timer apparatus stops the flow of the regulated liquid after a predetermined period of time.

At least two hydraulic mechanisms have been used to prevent the flow of a liquid through a conduit after a predetermined period: (i) float valves and (ii) restricted return flow valves. A float valve utilizes a tank and float wherein the tank retains fluid and the increasing amount of fluid retained supports and moves the float upward. The float is operatively engaged to a normally-open valve such that when the float has risen a preset distance the valve is closed. An example of this type of timer valve is described in U.S. Pat. No. 2,973,781. The liquid which is subject to control by the normally-open valve is the same liquid which is accumulated by the tank and used to close the valve. One disadvantage associated with this type of valve is that the liquid must be manually drained from the tank in order to reset the valve for a subsequent operation.

A restricted return flow valve includes a normally-closed valve which is manually opened. Return of the valve to its normally-closed position is impeded by a fluid which enters a chamber when the valve is manually opened. The valve closes when the chamber fluid is forced out of the chamber through an orifice. An example of this type of hydraulic timer valve is shown in U.S. Pat. No. 2,549,909. One perceived disadvantage of this type of timer valve is that it must be manually actuated in order to open the normally-closed valve and initiate the timing process.

In some situations it is desirable to have a timer valve which is entirely automatic in that it can cycle repeatedly without requiring human intervention. Thus, one of the drawbacks associated with prior art hydraulic timers is that they must be manually actuated or reset for each operation.

In an attempt to address this problem, automatic electrical timers have been utilized to regulate the flow of a fluid through a conduit. Such timers are certainly capable of completely automatic actuation and reset. However, electrical timers also have drawbacks which include: (1) they are difficult to install and repair as they must be connected to a source of electricity; (2) they are relatively expensive compared to hydraulic timers; and (3) they are safety hazards, especially when used near water.

Therefore, a substantial need exists for a simple, safe, completely automatic mechanical hydraulic timer valve. Such a valve could be advantageously utilized to control the amount of a liquid allowed to flow through and contat a cleaning chemical.

This need is fulfilled by the hydraulic timer of the present invention. It automatically and mechanically (not electrically) actuates upon the onset of flow of the regulated liquid and automatically and mechanically resets when the flow of regulated liquid through the hydraulic timer valve is shut off.

SUMMARY OF THE INVENTION

The present invention includes an automatic reset fluid-operated timer valve which includes a biased bearing arrangement sealingly engaged within a housing. The bearing arrangement preferably includes a larger bearing element, a smaller bearing element, and means for uniting the larger and smaller bearing elements The elements of the bearing arrangement preferably divide the housing into a pressure chamber and a flow chamber wherein the pressure chamber is defined by a first end of the housing and the larger bearing element and the flow chamber is defined by the smaller bearing element and the second end of the housing.

The bearing arrangement is preferably biased towards the first end of the housing or, in other words, biased in favor of a large flow chamber and a small pressure chamber. The pressure chamber has at least one port for allowing fluid to both enter and exit the pressure chamber. The flow chamber has at least one inlet port for allowing fluid to enter the flow chamber and at least one outlet port for allowing fluid to exit the flow chamber.

In operation, a preferred embodiment functions as follows: fluid is allowed to concurrently flow into the pressure chamber via the pressure chamber port and into and out of the flow chamber via the flow chamber inlet and outlet ports. Because the bearing plate defining the pressure chamber is larger than the bearing plate defining the flow chamber, the fluid pressure exerted upon the larger bearing plate coerces the bearing arrangement counter to the force exerted by the biasing means and towards the second end of the housing (thereby creating a larger pressure chamber and a smaller flow chamber). Fluid flow through the flow chamber is subject to being impeded by the smaller bearing element when the smaller bearing element is coerced far enough towards the second end of the housing to block either the flow chamber inlet port or the flow chamber outlet port.

The pressure chamber and flow chamber are preferably open to the atmosphere so that when fluid flow into the hydraulic timer device is stopped, the biasing means may return the bearing arrangement to its normal position by evacuating the fluid in the pressure chamber into the atmosphere, thereby resetting the hydraulic timer for another use. The fluid allowed to escape into the atmosphere may be (i) drained away, (ii) returned to the fluid flowing to a utilization point via the flow chamber if the utilization point is open to the atmosphere or preferably (iii) mixed with the fluid flowing to a utilization point via the flow chamber at the first utilization point.

The hydraulic timer may be used for dispensing a predetermined amount of a cleaning solution wherein the cleaning solution is formed by impinging a fluid upon a cleaning chemical. The hydraulic timer valve controls the amount of cleaning solution by controlling the amount of fluid allowed to contact the cleaning chemical.

"Utilization point", as used herein, refers to the point wherein the fluid flowing through the hydraulic timer (i.e., the regulated fluid controlled by the hydraulic timer) is used. There may be more than one utilization point and multiple utilization points may be in series or parallel.

As utilized herein, "cleaning chemical" refers to those chemicals utilized in the washing and cleaning of wares, textiles, floors, etc. Examples of such cleaning chemicals include detergents, bleaches, softeners, soaps, etc.

As utilized herein, "solvent" refers to those liquids commonly used as solvents including both organic and inorganic solvents with reference made to water as the most common solvent.

While the following description refers to a solvent mixed with a cleaning chemical, the invention is not limited to the dispensing of "solutions" in the strict sense of the word. Mixtures, slurries, emulsions, suspensions and the like are also contemplated for this use of a hydraulic timer device.

DETAILED DESCRIPTION OF A PREFERRED EMBODIMENT

Figure 1:
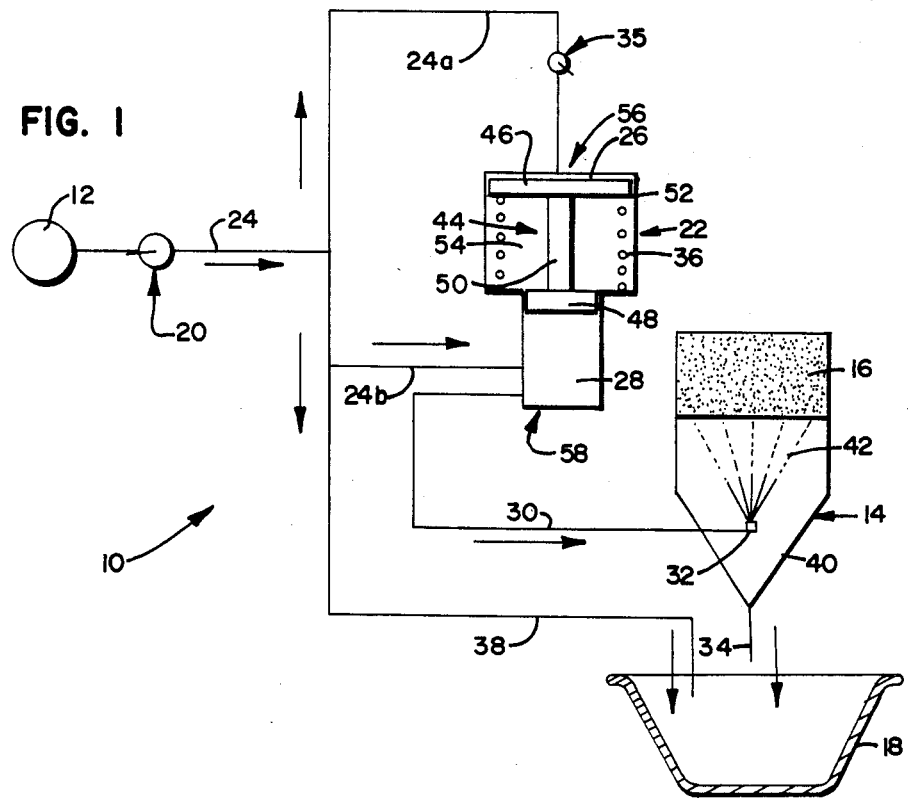
FIG. 1 shows a schematic view of a preferred dispenser system including a timer valve of the present invention, wherein the timer valve is open and beginning its closing process.

The Drawing shows a schematic view of a cleaning system 10 which includes a water supply 12, a cleaning chemical dispenser 14, and a sink 18. The chemical dispenser 14 preferably contains a cleaning compound 16 which is in solid, granulated or powdered form. U.S. Pat. Nos. 4,063,663 and 4,426,362, incorporated herein by reference, describe powdered and block detergent dispensers, respectively, which may be used as the cleaning chemical dispenser 14 shown in the Drawing. The system 10 provides means for combining water or any other solvent and compound 16 to produce a liquid cleaning solution which is directed to a utilization point 18 which could be a ware-washing sink 18 or the like.

Between and in fluid communication with the water supply 12 and the cleaning chemical dispenser 14 is a water supply line valve 20 and a normally-open hydraulic timer valve 22. Altnough the timer and valve portions of the timer valve 22 could be separate but interconnected components, the preferred embodiment is a device wherein the timer and valve are integral components as further described below.

The water supply 12 is preferably a pressurized source of water, wherein when the water supply line valve 20 is open, water can flow from the water supply 12 through the valve portion of hydraulic timer valve 22 and to the cleaning chemical dispenser 14. A water supply line 24 on the outlet side of the water supply valve 20 is connected to both a pressure chamber 26 and a flow chamber 28 of the hydraulic timer valve 22. In line 24a between supply valve 20 and pressure chamber 26 is an adjustable flow control valve 35.

A water supply line 30 runs from the flow chamber 28 to a nozzle 32 within the dispenser 14. A drain line 34 is connected at one end to the bottom of dispenser 14; the other end is located above sink 18 so that the cleaning solution will fall into the sink 18. Completing the basic hyraulic circuit is a sink fill line 38 which vents line 24 to the sink 18.

Thus, pressure chamber 26 and flow chamber 28 are open to the atmosphere so that when fluid flow to the hydraulic timer valve 22 is stopped by closing the water supply line valve 20, a biasing means or compression spring 36 may reset the hydraulic timer valve 22. Although the line 38 empties into the sink 18, in general the pressure chamber 26 could be vented in any fashion which would allow the biasing means or spring 36 to reset the timer valve 22 once the supply valve 20 is turned off. For example, the fluid vented to the atmosphere could be drained away or returned to the drain line 34 of the dispenser 14.

Figure 2:
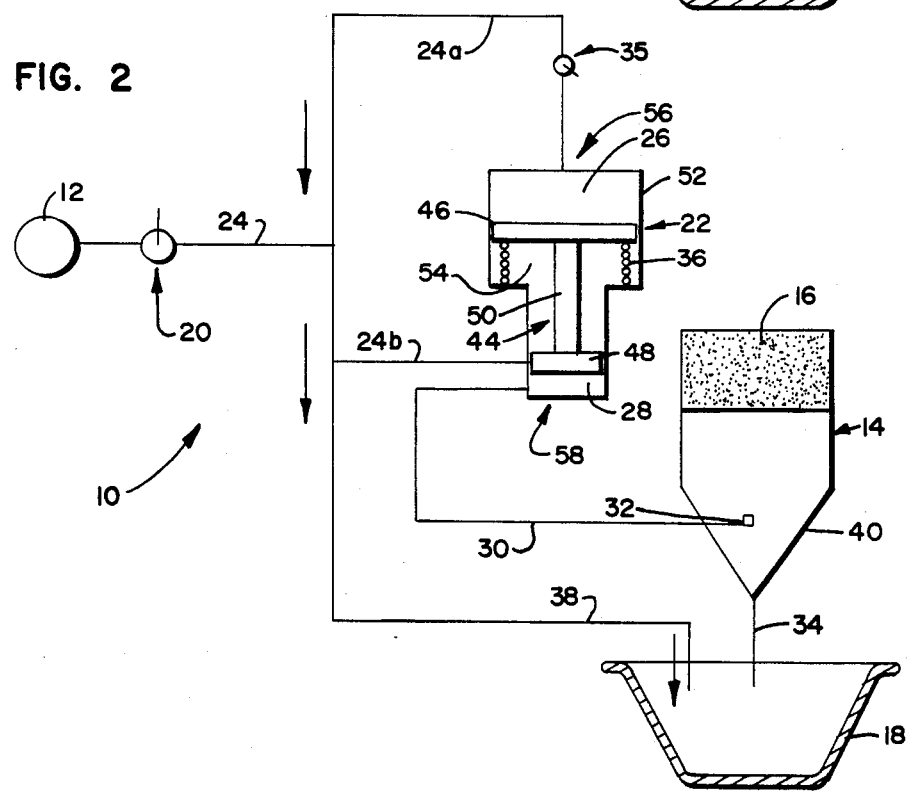
FIG. 2 shows a schematic view of the system of FIG. 1, wherein the timer valve is closed and beginning its opening process.

The cleaning chemical dispenser 14 preferably includes a canister 40 which contains a source of solid cleaning chemical. As FIGS. 1 and 2 illustrate, the solid cleaning chemical can be in the form of a cleaning chemical cake 16 located toward the top of the canister 40. As mentioned above, the water supply line 30 preferably terminates with a spray nozzle 32 located within the canister 40. The spray nozzle 32 is aimed towards the detergent cake 16 such that when a water spray 42 issues from the nozzle 32 it impinges and dissolves a portion of the cleaning chemical 16. The resulting cleaning chemical solution flows downward through canister 40 and is directed by drain line 34 to a utilization point or sink 18.

As described above, the hydraulic timer valves 22 controls the flow of water from the water source 12 to the cleaning chemical dispenser 14. The hydraulic timer valve 22 preferably has a bearing arrangement 44 having a larger bearing element 46, a smaller bearing element 48, and means 50 for uniting the larger and smaller bearing elements while maintaining a void between the elements. The bearing arrangement 44 is preferably slideably and sealingly engaged within a housing 52 wherein the housing 52 and the bearing arrangement 44 define three separate and distinct chambers: (i) the pressure chamber 26, (ii) a central chamber 54, and (iii) the flow chamber 28. The pressure chamber 26 is defined by the first end 56 of the housing 52 and the larger bearing element 46; the central chamber 54 is defined by the larger bearing element 46 and smaller bearing element 47; and the flow chamber 28 is defined by the smaller bearing element 48 and the second end 58 of the housing 52. The hydraulic timer valve 22 contains a biasing means or compression spring 36 for biasing the bearing arrangement 44 towards the first end 56 of the housing 52, thereby biasing the hydraulic timer valve 22 towards the open position (i.e., allowing fluid flow therethrough) and towards having a larger flow chamber 28 and a smaller pressure chamber 26.

Further regarding the timer valve 22, the pressure chamber 26 has a port proximate the housing first end 56 for allowing fluid to enter and exit the pressure chamber 26. The flow chamber 28 has an inlet port connected to line 24b and an outlet port connected to line 30 for allowing fluid to enter and exit the flow chamber 28, respectively, thereby allowing the continuous flow of fluid through the flow chamber 28. The pressure chamber 26 and the flow chamber 28. The pressure chamber 26 and the flow chamber 28 are interconnected with the water source 12 via the water supply line 24 so that water can flow into the pressure 26 and flow 28 chambers.

As discussed above, the pressure chamber 26 and flow chamber 28 are preferably vented to the atmosphere so that when fluid flow into the hydraulic timer valve 22 is stopped by closing the water supply line valve 20, the spring 36 may reset the hydraulic timer valve 22. Venting could be accomplished in various ways, and the invention is not limited to venting the liquid to the sink 18 as shown in FIGS. 1 and 2.

In the preferred embodiment, the bearing arrangement 44 includes a larger cylindrical piston 46, a smaller cylindrical piston 48 and a piston rod 50 connecting the larger 46 and smaller 48 pistons wherein the ratio of the larger piston surface area to the smaller piston surface area is about 10:1 to about 1.5:1, and preferably about 4:1 to 2:1.

The pressure 26 and the flow 28 chambers are preferably right angle cylinders sized to create a fluid-tight seal about the larger 46 and smaller 48 pistons, respectively.

The elements of the hydraulic timer valve 22 may be made from any durable, formable and impermeable substance, examples of which are metals such as polyethylene and polypropylene. Of course, the materials must be compatible with the solvent (e.g., water). A preferred material is polypropylene due to its ease of manufacture, durability, and resistance to corrosion.

It should be noted that a pressure regulating valve (not shown) could be included in line 24 of the system 10 in addition to the control valve 35 to better control the amount of solvent permitted to impinge on detergent cake 16.

In operation, the water supply valve 20 is opened to allow water to flow through the water supply line 24. Water concurrently flows into the pressure chamber 26 and the flow chamber 28. The water flowing into the flow chamber 28 is immediately directed out of the flow chamber 28 through the flow chamber outlet line 30 and to a utilization point (herein the cleaning chemical dispenser 14). Because the bearing element or piston 46 defining the pressure chamber 26 is larger than the bearing element of piston 48 defining the flow chamber 28, the introduction of water into the pressure chamber 26 coerces the bearing arrangement 44 counter to the force exerted by the spring 36 and towards the second end 58 of the housing 52, thus creating a larger pressure chamber 26 and a smaller flow chamber 28. When enough water has been introduced into the pressure chamber 26 to move the smaller bearing element 48 over either the flow inlet port connected to line 24b or the flow outlet port connected to line 30, flow through the hydraulic timer valve 22 to the cleaning chemical dispenser 14 is impeded and eventually prevented.

Referring to FIG. 1, those skilled in the art will recognize that the resistance to flow provided by line 38 must be sufficient to direct a portion of the flow through valve 35. The flow resistance of line 38 can be adjusted by simply varying the length of line 38 or by adjusting a valve (not shown) in the line 38.

Following closure of timer valve 22, water continues to flow into the pressure chamber 26 until the bearing apparatus 44 is depressed towards the second end 58 of the housing 52 as far as the water pressure, the spring 36 and the second end 58 of the housing 52 will allow. FIG. 2 shows the valve 22 in this state. All of the water flowing through the water supply line 24 will then flow through line 38 to the atmosphere discharge point above sink 18 until the water supply valve 20 is closed.

When the water supply valve 20 is closed water will no longer flow through the water supply line 24 and the spring 36 will coerce the bearing arrangement 44 towards the first end 56 of the housing 52, thereby forcing water held within the pressure chamber 26 out through lines 24a and 38. FIG. 2 shows the timer valve 22 in its fully closed state immediately after the spring 36 begins to move the bearing arrangement 44 toward the first end 56 of the housing 52. The timer valve 22 is shown in its fully reset state in FIG. 1. The arrows in FIGS. 1 and 2 indicate the direction of water flow through lines 24, 30 and 38 depending on whether the valve 22 is in the process of closing (FIG. 1) or opening (FIG. 2).

The description presented above is given to aid in the complete nonlimiting understanding of the invention. Since many variations and embodiments of the invention can be made without departing from the spirit and scope of the invention, the invention resides in the claims hereinafter appended.

I claim:

1. A fluid-operated timer valve suitable for utilizing a source of pressurized control fluid to place a source of pressurized regulated fluid and a utilization point in fluid communication for a preselected period of time, comprising:
  (a) a timer component comprising:
    (i) a timer housing;
    (ii) a bearing arrangement sealingly engaged with the timer housing having a first position and a second position, wherein the timer housing and the bearing arrangement form pressure chamber;
    (iii) means for selectively placing the pressure chamber in fluid communication with the source of pressurized control fluid; and
    (iv) means for venting the pressure chamber;
  (b) a valve component comprising:
    (i) a valve housing;
    (ii) a moveable valve element operatively engaged with the valve housing and having a first position and a second position;
    (iii) means for placing the valve component in fluid communication with the pressurized source of regulated fluid; and
    (iv) means for placing the valve component in fluid communication with the utilization point;
  (c) means for coupling the bearing arrangement of the timer component and the moveable element of the valve component; wherein the first position of the bearing arrangement corresponds to the first position of the moveable valve element and the second position of the bearing arrangement corresponds to the second position of the moveable valve element;

wherein the source of pressurized regulated fluid and the utilization point are in fluid communication when the bearing arrangement and the moveable valve element are in their first positions; and wherein the source of regulated fluid and the utilization point are not in fluid communication when the bearing arrangement and the moveable valve element are in their second positions; and (d) resilient means for biasing the bearing arrangement and the moveable valve element toward their first positions, wherein when the pressure chamber is supplied with pressurized control fluid the bearing arrangement and the moveable valve element are moved from their first positions to their second positions during the preselected period of time, and when the pressure chamber is taken out of fluid communication with the source of pressurized control fluid the venting means enables the resilient means to reset the fluid-operated timer by moving the bearing arrangement and the moveable valve element from their second positions to their first positions.

2. The fluid-operated timer of claim 1, wherein the pressure chamber is in fluid communication with the valve component and a portion of the regulated fluid is used as the control fluid.

3. The fluid-operated timer of claim 2, wherein the regulated and control fluid is water, abnd wherein the utilization point is a source of cleaning chemical, whereby a solution of cleaning chemical and water is produced substantially during the preselected period of time.

4. A hydraulic timer valve suitable for placing a source of pressurized water and a utilization point in fluid communication for a preselected period of time, comprising:

(a) a bearing arrangement comprising:
  (i) a first bearing element;
  (ii) a second bearing element having a smaller surface area than the first bearing element; and
  (iii) means for uniting the first and second bearing elements;
(b) a timer housing having a first end and a second end for slideably receiving the bearing arrangement, wherein a pressure chamber is defined by the first end of the housing and the first bearing element, and wherein a flow chamber is defined by the second bearing element and the second end of the housing;
(c) a pressure chamber port for allowing water to enter and exit the pressure chamber;
(d) a flow chamber inlet port for allowing water to enter the flow chamber;
(e) a flow chamber outlet port for allowing water to exit the flow chamber; and
(f) means for placing the pressure chamber in fluid communication with the flow chamber, wherein when water flows into the pressure chamber water flow through the flow chamber is subject to being impeded by the smaller bearing element when the bearing arrangement is coerced toward the second end of the housing, whereby water can flow from the source of pressurized water to the utilization point for the preselected period of time.

5. The hydraulic timer valve of claim 4 wherein:
(a) the first bearing element comprises a first piston;
(b) the second bearing element comprises a second piston; and
(c) the bearing element uniting means comprises a piston rod.

6. The hydraulic timer valve of claim 5 wherein the pressure chamber and the flow chamber comprise right angle circular cylinders.

7. The hydraulic timer valve of claim 4 wherein fluid flow through the flow chamber is prevented when the second bearing element covers the flow chamber inlet port.

8. The hydraulic timer valve of claim 4 wherein the biasing means comprises a spring.

9. The hydraulic timer valve of claim 4 wherein the ratio of the surface area of the first bearing element to the surface area of the second bearing element is about 1.5:1 to 10:1.

10. The hydraulic timer valve of claim 4 wherein the ratio of the surface area of the first bearing element to the surface area of the second bearing element is about 2:1 to 4:1.

11. The hydraulic timer valve of claim 4 further comprising:

(a) a conduit connected to the flow chamber outlet port for directing the water to the utilization point;
(b) a conduit series interconnecting (i) the pressure chamber port, (ii) the flow chamber inlet port, and (iii) the source of pressurized water, for concurrently directing the water into the pressure chamber and the flow chamber, wherein the conduit series is open to the atmosphere for allowing the biasing means to reset the hydraulic timer valve when the conduit series is closed to the introduction of water from the pressurized source of water; and
(c) means for opening and closing the conduit series to water flow therethrough from the source of pressurized water.

12. The hydraulic timer of claim 11 further comprising an adjustable control valve connected to the conduit series for controlling the rate of water flow into the presure chamber.

13. An automatic reset hydraulic timer valve which comprises:

(a) a piston arrangement comprising:
  (i) a first piston, having a first bearing surface;
  (ii) a second piston, having a second bearing surface, wherein the first bearing surface is larger than the second bearing surface; and
  (iii) a piston rod uniting the first and second pistons;
(b) a housing for slideably engaging the piston arrangement, the housing having:
  (i) a first end and a second end;
  (ii) a right angle circular cylinder pressure chamber defined by the first end of the housing and the first piston;
  (iii) a right angle circular cylinder central chamber defined by the first and second pistons;
  (iv) a right angle circular cylinder flow chamber defined by the second piston and the second end of the housing;
  (v) a pressure chamber port for allowing fluid to enter and exit the pressure chamber;
  (vi) a flow chamber inlet port for allowing fluid to enter the flow chamber; and
  (v) a flow chamber outlet port for allowing the fluid to exit the flow chamber; and
(c) a spring contained in the central chamber in contact with the piston arrangement and the housing for biasing the piston arrangement toward the first end of the housing, wherein fluid flow through the flow chamber is substantially prevented by the second piston when the piston arrangement is coerced towards the second end of the housing so that the second piston covers the flow chamber inlet port.

14. The hydraulic timer of claim 13 further comprising:
(a) a conduit connected to the flow chamber outlet port for directing the fluid to a utilization point;
(b) a conduit series interconnecting (i) the pressure chamber port, (ii) the flow chamber inlet port, and (iii) a pressurized source of fluid for concurrently directing fluid into the pressure chamber and the flow chamber, wherein the conduit series is open to the atmosphere for allowing the spring to reset the hydraulic timer valve when the conduit series is closed to the introduction of fluid from the pressurized source of fluid;
(c) a main valve for opening and closing the conduit series to fluid flow therethrough from the pressurized source of fluid; and
(d) an adjustable control valve connected to the conduit series for controlling the rate of fluid flow into the pressure chamber.

15. An apparatus for producing a predetermined amount of cleaning chemical solution comprising:
(a) a cleaning chemical source;
(b) means for concurrently directing a single pressurized solvent flow to:
(i) the cleaning chemical source to make the cleaning solution; and
(ii) the atmosphere;
(c) means for directing the cleaning chemical solution to a utilization point;
(d) a hydraulic timer valve in fluid communication with the solvent directing means suitable for preventing the flow of solvent to the cleaning chemical source after a predetermined period of time, the hydraulic timer valve comprising:
(i) a bearing arrangement comprising:
(A) a first bearing element;
(B) a second bearing element, wherein the first bearing element has a larger surface area than the second bearing element; and
(C) means for uniting the first and second bearing elements while maintaining a void between the first and second bearing elements;
(ii) a housing for slideably engaging the bearing arrangement, the housing having:
(A) a first end and a second end;
(B) a pressure chamber defined by the first end of the housing and the first bearing element;
(C) a central chamber defined by the first and second bearing elements;
(D) a flow chamber defined by the second bearing element and the second end of the housing;
(E) a pressure chamber port in fluid communication with the solvent directing means for allowing the solvent to enter and exit the pressure chamber;
(F) a flow chamber inlet port in fluid communication with the solvent flow means for allowing fluid to enter the flow chamber; and
(G) a flow chamber outlet port in fluid communication with the solvent directing means for allowing the solvent to exit the flow chamber; and
(iii) means for biasing the bearing arrangement towards the first end of the housing; and
(e) a main solvent valve in fluid communication with the solvent directing means for opening and closing the solvent flow means to fluid flow therethrough from the pressurized source of solvent, wherein solvent flow through the flow chamber to the cleaning chemical source is subject to being impeded by the second bearing element when the bearing arrangement is moved proximate to the second end of the housing following the predetermined period of time.

16. The apparatus of claim 15 wherein:
(a) the first bearing element comprises a first piston;
(b) the second bearing element comprises a second piston; and
(c) the bearing uniting means comprises a piston rod.

17. The apparatus of claim 16 wherein the pressure and flow chambers comprise right angle circular cylinders.

18. The apparatus of claim 15 wherein fluid flow through the flow chamber is prevented when the second bearing element covers the flow chamber inlet port.

19. The apparatus of claim 15 wherein the biasing means comprises a spring.

20. The apparatus of claim 15 wherein the ratio of the surface area of the first bearing element to the surface area of the second bearing element is about 1.5:1 to 10:1.

21. The apparatus of claim 15 wherein the ratio of the surface area of the first bearing element to the surface area of the second bearing element is about 2:1 to 4:1.

22. An apparatus for producing a predetermined amount of cleaning chemical solution comprising:
(a) a cleaning chemical container for retaining cleaning chemical;
(b) a conduit series for concurrently directing a solvent flow to:
(i) the cleaning chemical container to make cleaning chemical solution; and
(ii) the atmosphere;
(c) a conduit attached to the cleaning chemical container for directing the cleaning chemical solution to its utilization point; and
(d) a hydraulic timer valve in fluid communication with the conduit series between the atmospheric discharge point and the cleaning chemical container discharge point, for preventing the flow of solvent to the cleaning chemical container after a predetermined period of time, the hydraulic timer comprising:
(i) a piston arrangement comprising:
(A) a first piston, having a first bearing surface;
(B) a second piston, having a second bearing surface smaller than the first bearing surface; and
(C) a piston rod uniting the first and second pistons;
(ii) a housing for slideably engaging the piston arrangement, the housing having:
(A) a first end and a second end;
(B) a right angle circular cylinder pressure chamber defined by the first end of the housing and the first piston;
(C) a right angle circular cylinder central chamber defined by the first and second pistons;

(D) a right angle circular cylinder flow chamber defined by the second piston and the second end of the housing;

(E) a pressure chamber port in fluid communication with the conduit at a point prior to the point where the solvent enters the flow chamber, for allowing the solvent to enter and exit the pressure chamber;

(F) a flow chamber inlet port in fluid communication with the conduit for allowing fluid to enter the flow chamber; and (G) a flow chamber outlet port in fluid communication with the conduit for allowing the solvent to exit the flow chamber; and (iii) a spring contained in the central chamber and in contact with the piston arrangement and the housing for biasing the piston arrangement towards the first end of the housing, wherein the solvent flow through the flow chamber is prevented by the second piston when the piston arrangement is coerced to the second end of the housing after the predetermined period of time so that the second piston covers the flow chamber inlet port.

* * * * *